United States Patent

Rolinski et al.

[11] 4,309,901
[45] Jan. 12, 1982

[54] HEAT TRANSFER CALIBRATION PLATE

[75] Inventors: Edmund J. Rolinski, Montgomery County, Ohio; Bernard Laub, Santa Clara County, Calif.

[73] Assignee: The United States of America as represented by the Secretary of the Air Force, Washington, D.C.

[21] Appl. No.: 104,925

[22] Filed: Dec. 18, 1979

[51] Int. Cl.³ .................. G01K 17/06; G01M 9/00
[52] U.S. Cl. .................. 73/147; 73/190 H; 73/340
[58] Field of Search .......... 73/147, 190 H, 15 A, 73/349, 357, 204

[56] References Cited

U.S. PATENT DOCUMENTS

| | | | |
|---|---|---|---|
| 2,493,651 | 1/1950 | Boelter et al. | 73/190 H |
| 2,875,613 | 3/1959 | Neal | 73/190 H |
| 2,938,122 | 5/1960 | Cole | 73/190 H |
| 2,942,460 | 6/1960 | Morgan | 73/147 |
| 3,075,377 | 1/1963 | Lang | 73/15 A |
| 3,148,531 | 9/1964 | Stoll et al. | 73/15 A |
| 3,605,490 | 9/1971 | Progelhof et al. | 73/190 H |
| 3,712,131 | 1/1973 | Smith | 73/190 H |
| 3,744,305 | 7/1973 | Sabol et al. | 73/147 |
| 4,198,859 | 4/1980 | Holtermann | 73/190 H |
| 4,231,248 | 11/1980 | Rolinski et al. | 73/147 |

*Primary Examiner*—Daniel M. Yasich
*Attorney, Agent, or Firm*—Donald J. Singer; Richard J. Killoren

[57] ABSTRACT

A heat transfer calibration plate for use in obtaining data for determining the heat transfer coefficient in a wind tunnel test system having a copper plate mounted in an aluminum support plate. Nine heat flux gages are positioned in a horizontal and a vertical row with a center gage common to the two rows. A heater is provided to heat the plate to the desired temperature. Thermocouples are provided to indicate plate temperature. Outputs of the thermocouples and heat flux gages are recorded on a recorder. All of the heat flux gages except the center gage are connected to the recorder through a rotary switch. Plenum temperature and pressure are also recorded.

1 Claim, 6 Drawing Figures

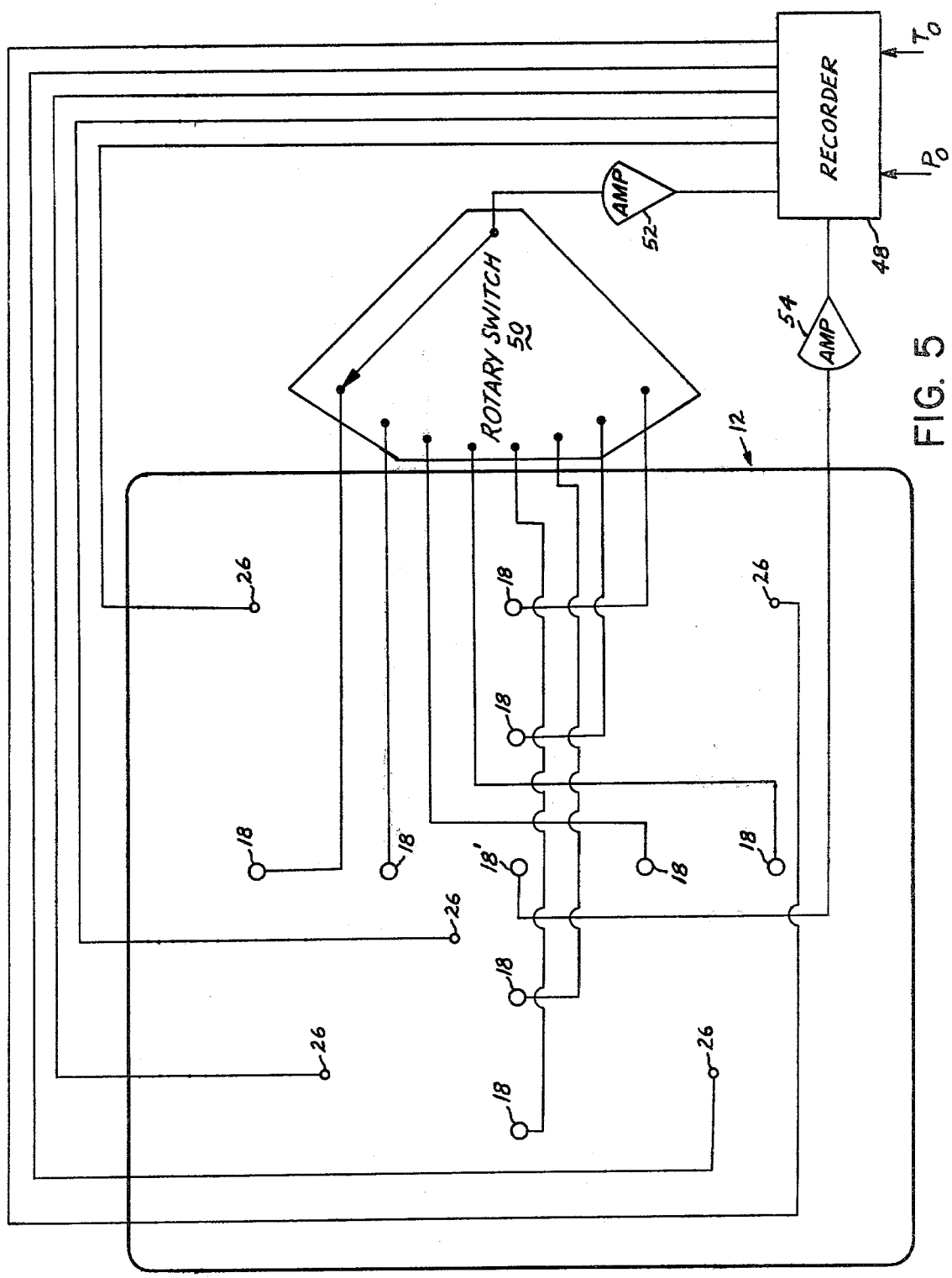

HEAT TRANSFER CALIBRATION PLATE

RIGHTS OF THE GOVERNMENT

The invention described herein may be manufactured and used by or for the Government of the United States for all governmental purposes without the payment of any royalty.

BACKGROUND OF THE INVENTION

This invention relates to apparatus for obtaining data for determining the heat transfer coefficient for use in wind tunnel laser hardened material evaluation.

In laser hardened material evaluation, material performance in flight environments is simulated by air flow over the sample surface during laser irradiation. Proper simulation of flight phenomena in the laboratory requires an accurate definition of the magnitude and distribution of the heat transfer coefficient over the entire operating range of the wind tunnel.

Experimental techniques employing layer probes to characterize the flow field have been used but these are tedious and require significant data interpretation.

BRIEF SUMMARY OF THE INVENTION

According to this invention, a heat transfer calibration plate is provided for use in determining the heat transfer coefficient at the sample surface for laser hardened material common test configurations. The heat transfer calibration plate includes an anodized copper plate supported in an anodized aluminum mounting plate. The copper plate is heated with a foil type heater and has nine heat flux gages positioned in a horizontal row and a vertical row in the copper plate. Five thermocouples are secured to the back of the copper plate to provide plate temperature values. The thermocouple outputs and heat flux gage outputs are supplied to a recorder.

IN THE DRAWINGS

FIG. 5 is a schematic diagram showing the output circuit for the device of FIG. 1.

DETAILED DESCRIPTION OF THE INVENTION

Figure 1:
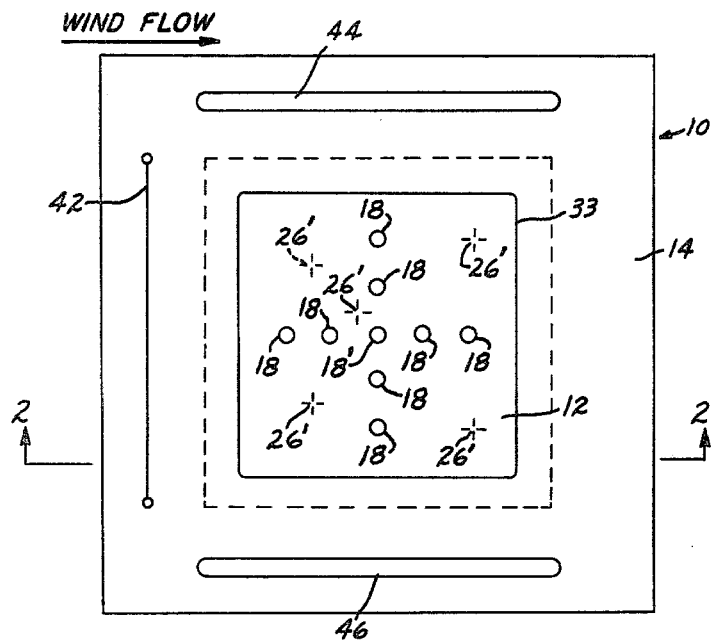
FIG. 1 is a partially schematic plan view of a heat flux plate according to the invention.
Figure 2:
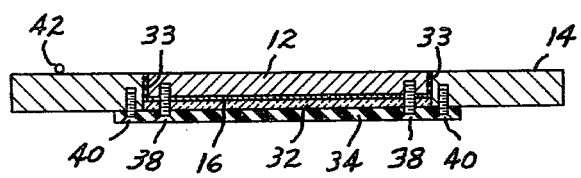
FIG. 2 is a partially schematic sectional view of the device of FIG. 1 along the line 2—2.

Reference is now made to FIGS. 1 and 2 of the drawing which shows a calibration plate 10 including a copper plate 12 mounted in an aluminum mounting plate 14. A heater 16 is positioned adjacent the back of plate 12. Nine heat flux gages 18 and 18' are positioned in a horizontal row and a vertical row in the copper plate with the center gage 18' being common to the horizontal row and the vertical row. The heat flux gages have their sensing surface 22 flush with the front surface 24 of the copper plate, as shown in FIG. 3.

In a device constructed the heat flux gages have 3/16-inch outside diameter with $\frac{1}{8}$-inch diameter active area and are Gardon gages made by Thermogage Inc. The spacing between the gages is $\frac{1}{2}$ inch. The copper plate 12 is 3-inch square and 0.25 inch thick. The mounting plate 14 is 6-inch square and $\frac{3}{8}$ inch thick with a 3.06-inch square cutout to accommodate the copper plate 12.

Figure 4:
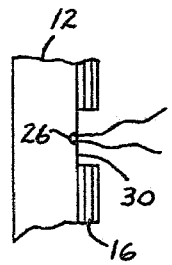
FIG. 4 is an enlarged schematic view showing the position of one of the thermocouples used in the device of FIG. 1.

Five thermocouples 26 are secured to the back of the plate 12, one of which is shown in FIG. 4. The thermocouples are located relative to the heat flux gages in the positions indicated schematically at 26' on the front of plate 12, in FIG. 1. The thermocouples provide an indication of plate temperature. The thermocouples in a device constructed are Cromel/Alumel thermocouples. The thermocouples may be secured to the copper plate 12 in a conventional manner, such as by drilling and peening.

Figure 3:
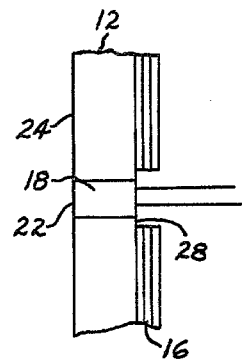
FIG. 3 is an enlarged schematic view showing how one of the heat flux gages is positioned in the device of FIG. 1.

The heater 16 has cut out portions 28 and 30, shown in FIGS. 3 and 4, to accommodate the leads for the heat flux gages 18 and the thermocouples 26.

A sheet of heat insulation material 32 is positioned adjacent heater 16 and directs heat from the heater toward plate 12. Insulation material 33 is provided in the space between the copper plate 12 and the mounting plate 14. A backup plate 34 of a phenolic resin impregnated cloth presses on the insulation layer 32 and presses the heater 16 against the copper plate 12.

In a device constructed, the heater 16 is a 3-inch square foil heater, fabricated by Thermal Circuits Inc., held between two thin mica sheets is held against the copper plate 12 by a $\frac{1}{8}$-inch thick insulation blanket of Fiberflax made by U.S. Carborundum Corp. The insulation material 33 was also Fiberflax. The material used in the backup plate 34 is Marcarta made by Westinghouse. Screws 38 and 40, two of each of which are shown, secure the backup plate to the copper plate 12 and the mounting plate 14.

A 3-mill wire 42 is secured to backing plate 14 a predetermined distance upstream from the heat flux gages, for changing laminar flow over the surface of the conductive plate 12 to turbulent flow. In a device constructed, the wire was approximately 1 inch from the nearest heat flux gage and was secured to the plate 14 with an epoxy.

Mounting slots 44 and 46 are provided at the top and bottom of the mounting plate 14 for securing the calibration plate in a wind tunnel flow. The device could be mounted in the Laser Tensile Test Sample Holder, U.S. Pat. No. 4,231,248 to Edmund J. Rolinski and Bernard M. Laub, assigned to the assignee herein, in which case the mounting slots 44 and 46 would not be needed.

The outputs of the thermocouples 26 are connected to a recorder 48, as shown in FIG. 5, and provide an indication of plate temperature $T_w$. The outputs of heat flux gages 18 are connected to the recorder 48 through a rotary switch 50 and an operational amplifier 52 and provide an indication of heat flux Q. The center heat flux gage 18' is connected to the recorder 48 through a separate operational amplifier 54 to provide a continuous output from the center heat flux gage. A wind tunnel plenum temperature input $T_o$ and a plenum pressure input $P_o$ are also supplied to the recorder. In a device constructed, an oscillograph recorder was used.

Figure 6:
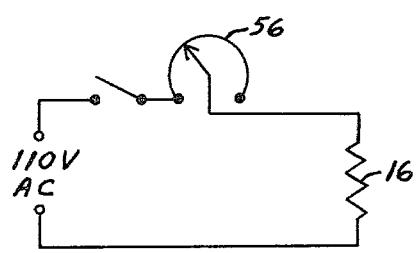
FIG. 6 is a schematic diagram showing the heater supply circuit for the device of FIG. 1.

The heater 16 is supplied from a 110 volt AC supply through a rheostat 56, as shown in FIG. 6, to provide a maximum power density of 50 watts/in$^2$.

In the operation of the device, the heat transfer calibration plate is positioned in the wind tunnel flow, for example as in the sample holder of our copending application "Laser Tensile Test Sample Holder", U.S. Pat. No. 4,231,248 to Edmund J. Rolinski and Bernard M. Laub, assigned to the assignee herein.

The heater 16 is then energized until the desired temperature obtained, as indicated by the thermocouples 26, which for tests made have been between 200° F. and 250° F. It has been found the temperature of plate 12 is uniform to within 2° F. Thus, for some tests, the use of the output of a single thermocouple has been adequate. The recorder is then started, the heater is switched off and the wind tunnel is started and allowed to stabilize. The parameters $P_o$, $T_o$, $T_w$, and Q are continuously recorded. With these parameters and the active area A of the heat flux gage known, the heat transfer coefficient h, at the position of each of the heat flux gages can be determined from the heat transfer expression:

$$Q = hA(T_w - T_o)$$

From this information the heat transfer characteristics of a wind tunnel test system can be evaluated.

There is thus provided an apparatus for obtaining data for determining the heat transfer coefficient in a wind tunnel test system.

We claim:

1. Apparatus for determining the heat transfer cofficient in a wind tunnel test facility which comprises:
   a. a support plate;
   b. means for mounting said support plate in the aerodynamic flow of a wind tunnel test facility;
   c. a heat conductive plate secured to said support plate;
   d. means for supplying heat to said conductive plate;
   e. a plurality of heat flux gages on said conductive plate for indicating the heat flux at a plurality of positions on said conductive plate, a portion of said gages being positioned in a horizontal row and a portion of said gages being positioned in a vertical row with one gage common to the horizontal row of gages and the vertical row of gages;
   f. a thermocouple connected to said conductive plate for indicating the temperature of said plate;
   g. means, connected to said support plate a predetermined distance from said heat flux gages, for changing laminar flow over the surface of the conductive plate to turbulent flow;
   h. a recorder;
   i. means connecting the output of said thermocouple to said recorder;
   j. means for connecting the heat flux gage, common to the horizontal row of gages and the vertical row of gages, to said recorder;
   k. a selector switch; and
   l. means for connecting the output of all the heat flux gages, except the one common to the horizontal and vertical rows of gages, to said recorder through said selector switch.

* * * * *